US012467886B2

(12) United States Patent
Desjeans-Gauthier et al.

(10) Patent No.: US 12,467,886 B2
(45) Date of Patent: *Nov. 11, 2025

(54) TRAY INSERT FOR SCREENING TRAY

(71) Applicant: Rapiscan Holdings, Inc., Hawthorne, CA (US)

(72) Inventors: Philippe Desjeans-Gauthier, St-Laurent (CA); Emmanuel St-Aubin, St-Laurent (CA); Simon Archambault, St-Laurent (CA); William Awad, St-Laurent (CA)

(73) Assignee: Rapiscan Holdings, Inc., Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/628,419

(22) Filed: Apr. 5, 2024

(65) Prior Publication Data
US 2024/0353354 A1 Oct. 24, 2024

Related U.S. Application Data

(63) Continuation of application No. 17/286,858, filed as application No. PCT/CA2019/051489 on Oct. 21, 2019, now Pat. No. 11,977,037.

(Continued)

(51) Int. Cl.
*G01N 23/10* (2018.01)
*G01N 23/083* (2018.01)
*G01V 5/22* (2024.01)

(52) U.S. Cl.
CPC .......... *G01N 23/10* (2013.01); *G01N 23/083* (2013.01); *G01N 2223/3307* (2013.01);
(Continued)

(58) Field of Classification Search
CPC ..... G01N 2223/3307; G01N 2223/637; G01N 2223/639; G01N 23/083; G01N 23/10; G01V 5/22
See application file for complete search history.

(56) References Cited

U.S. PATENT DOCUMENTS 4,020,346 A 4/1977 Dennis
4,618,978 A 10/1986 Cosman
(Continued)

FOREIGN PATENT DOCUMENTS

CA 1301371 5/1992
CA 2163884 12/1994
(Continued)

OTHER PUBLICATIONS

International Search Report for International Application No. PCT/CA2019/051489, dated Dec. 30, 2019, (pp. 4).
(Continued)

*Primary Examiner* — David J Makiya
*Assistant Examiner* — Soorena Kefayati
(74) *Attorney, Agent, or Firm* — Novel IP

(57) ABSTRACT

An article for screening includes a top surface and a bottom surface. A forward wall, an aft wall and side walls each extend between the top surface and the bottom surface. A longitudinal recess extends at least partially across the top surface has a first lateral wall extending away from the top surface toward the bottom surface and meeting with a base wall at a predetermined angle therebetween for positioning of a liquid material relative to the first lateral wall and the base wall. The predetermined angle is for restricting data in a data range provided by a scanning operation of the liquid material to data provided within the predetermined angle between the first lateral wall and the base wall of the recess. The liquid material may be contained within a container (Continued)

positioned within the recess. Preferably, the article is an insert for a security screening tray.

15 Claims, 7 Drawing Sheets

Related U.S. Application Data

(60) Provisional application No. 62/748,841, filed on Oct. 22, 2018.

(52) U.S. Cl.
CPC . *G01N 2223/637* (2013.01); *G01N 2223/639* (2013.01); *G01V 5/22* (2024.01)

(56) References Cited

U.S. PATENT DOCUMENTS

| | | |
|---|---|---|
| 4,872,188 A | 10/1989 | Lauro |
| 5,044,002 A | 8/1991 | Stein |
| 5,164,590 A | 11/1992 | Coles |
| 5,532,492 A | 7/1996 | He |
| 5,541,856 A | 7/1996 | Hammermeister |
| 5,600,700 A | 2/1997 | Krug |
| 5,768,334 A | 6/1998 | Maitrejean |
| 5,838,758 A | 11/1998 | Krug |
| 5,872,829 A | 2/1999 | Wischmann |
| 5,974,111 A | 10/1999 | Krug |
| 6,005,912 A | 12/1999 | Ocleppo |
| 6,018,562 A | 1/2000 | Willson |
| 6,058,159 A | 5/2000 | Conway |
| 6,081,580 A | 6/2000 | Grodzins |
| 6,218,943 B1 | 4/2001 | Ellenbogexn |
| 6,304,629 B1 | 10/2001 | Conway |
| 6,379,043 B1 | 4/2002 | Zylka |
| 6,453,003 B1 | 9/2002 | Springer |
| 6,453,007 B2 | 9/2002 | Adams |
| 6,490,477 B1 | 12/2002 | Zylka |
| 6,590,956 B2 | 7/2003 | Fenkart |
| 6,895,072 B2 | 5/2005 | Schrock |
| 6,928,137 B2 | 8/2005 | Bruder |
| 6,993,111 B1 | 1/2006 | Annis |
| 7,020,241 B2 | 3/2006 | Beneke |
| 7,062,011 B1 | 6/2006 | Tybinkowski |
| 7,139,406 B2 | 11/2006 | McClelland |
| 7,158,611 B2 | 1/2007 | Heismann |
| 7,162,005 B2 | 1/2007 | Bjorkholm |
| 7,164,750 B2 | 1/2007 | Nabors |
| 7,221,732 B1 | 5/2007 | Annis |
| 7,319,737 B2 | 1/2008 | Singh |
| 7,339,159 B2 | 3/2008 | Juh |
| 7,384,194 B2 | 6/2008 | Gatten |
| 7,417,440 B2 | 8/2008 | Peschmann |
| 7,453,987 B1 | 11/2008 | Richardson |
| 7,486,772 B2 | 2/2009 | Lu |
| 7,579,845 B2 | 8/2009 | Peschmann |
| 7,606,348 B2 | 10/2009 | Foland |
| 7,634,051 B2 | 12/2009 | Robinson |
| 7,636,418 B2 | 12/2009 | Anwar |
| 7,656,995 B2 | 2/2010 | Robinson |
| 7,668,289 B2 | 2/2010 | Proksa |
| 7,672,427 B2 | 3/2010 | Chen |
| 7,693,261 B2 | 4/2010 | Robinson |
| 7,706,507 B2 | 4/2010 | Williamson |
| 7,734,066 B2 | 6/2010 | DeLia |
| 7,831,012 B2 | 11/2010 | Foland |
| 7,873,201 B2 | 1/2011 | Eilbert |
| 7,876,879 B2 | 1/2011 | Morton |
| 7,945,017 B2 | 5/2011 | Chen |
| 7,965,816 B2 | 6/2011 | Kravis |
| 8,009,799 B2 | 8/2011 | Doyle |
| 8,009,800 B2 * | 8/2011 | Doyle ............... G01V 5/20 378/207 |
| 8,014,493 B2 * | 9/2011 | Roux ............... G01N 23/04 378/207 |
| 8,031,903 B2 | 10/2011 | Paresi |
| 8,098,794 B1 | 1/2012 | Fernandez |
| 8,116,428 B2 * | 2/2012 | Gudmundson ........ G01N 23/10 378/53 |
| 8,138,770 B2 | 3/2012 | Peschmann |
| D658,294 S | 4/2012 | Awad |
| 8,189,889 B2 | 5/2012 | Pearlstein |
| 8,233,588 B2 | 7/2012 | Gibson |
| 8,284,896 B2 | 10/2012 | Singh |
| 8,311,309 B2 | 11/2012 | Siedenburg |
| 8,320,523 B2 | 11/2012 | Zhang |
| 8,401,270 B2 | 3/2013 | Eilbert |
| 8,428,217 B2 | 4/2013 | Peschmann |
| 8,478,016 B2 | 7/2013 | Robinson |
| 8,515,010 B1 | 8/2013 | Hurd |
| 8,537,968 B2 | 9/2013 | Radley |
| 8,674,706 B2 | 3/2014 | Peschmann |
| 8,774,357 B2 | 7/2014 | Morton |
| 8,781,066 B2 | 7/2014 | Gudmundson |
| 8,831,331 B2 * | 9/2014 | Gudmundson ........... G06T 7/60 382/209 |
| 8,867,816 B2 * | 10/2014 | Bouchard ................. G06T 7/00 382/101 |
| 8,879,791 B2 | 11/2014 | Drouin |
| 9,042,511 B2 | 5/2015 | Peschmann |
| 9,170,212 B2 | 10/2015 | Bouchard |
| 9,189,846 B2 | 11/2015 | Wismüller |
| 9,194,975 B2 | 11/2015 | Drouin |
| 9,196,082 B2 | 11/2015 | Pearlstein |
| 9,268,058 B2 | 2/2016 | Peschmann |
| 9,311,277 B2 | 4/2016 | Rinkel |
| 9,681,851 B2 | 6/2017 | Rohler |
| 9,746,431 B2 | 8/2017 | Grader |
| 9,823,383 B2 * | 11/2017 | Hanley .................. G01V 5/224 |
| 9,989,508 B2 | 6/2018 | Awad |
| 10,089,956 B2 | 10/2018 | Awad |
| 10,180,483 B2 | 1/2019 | Holdsworth |
| 10,254,436 B2 | 4/2019 | Awad |
| 10,510,319 B2 | 12/2019 | Awad |
| 10,555,716 B2 | 2/2020 | Rohler |
| 10,557,911 B2 | 2/2020 | Holdsworth |
| 10,650,783 B2 | 5/2020 | Awad |
| 10,795,047 B2 | 10/2020 | St-Aubin |
| 10,795,048 B2 | 10/2020 | St-Aubin |
| 10,795,049 B2 | 10/2020 | St-Aubin |
| 10,809,414 B2 | 10/2020 | St-Aubin |
| 10,901,114 B2 | 1/2021 | St-Aubin |
| 11,073,486 B2 | 7/2021 | Siegrist |
| 11,116,471 B2 | 9/2021 | Rohler |
| 11,430,109 B2 | 8/2022 | Cochran |
| 11,478,214 B2 | 10/2022 | Siewerdsen |
| 2001/0014137 A1 | 8/2001 | Bjorkholm |
| 2003/0085348 A1 | 5/2003 | Megerle |
| 2004/0091078 A1 | 5/2004 | Ambrefe |
| 2004/0179643 A1 | 9/2004 | Gregerson |
| 2005/0008126 A1 | 1/2005 | Juh |
| 2005/0025280 A1 | 2/2005 | Schulte |
| 2005/0058242 A1 | 3/2005 | Peschmann |
| 2005/0117700 A1 | 6/2005 | Peschmann |
| 2006/0098866 A1 | 5/2006 | Whitson |
| 2007/0003009 A1 | 1/2007 | Gray |
| 2007/0116177 A1 | 5/2007 | Chen |
| 2007/0132580 A1 | 6/2007 | Ambrefe, Jr. |
| 2007/0133742 A1 | 6/2007 | Gatten |
| 2007/0172129 A1 | 7/2007 | Tortora |
| 2007/0235652 A1 | 10/2007 | Smith |
| 2007/0280502 A1 | 12/2007 | Paresi |
| 2008/0025470 A1 | 1/2008 | Streyl |
| 2008/0063140 A1 | 3/2008 | Awad |
| 2008/0232668 A1 | 9/2008 | Kitamura |
| 2009/0010386 A1 | 1/2009 | Peschmann |
| 2009/0060135 A1 | 3/2009 | Morton |
| 2009/0196396 A1 | 8/2009 | Doyle |
| 2009/0285353 A1 | 11/2009 | Ellenbogen |
| 2010/0002834 A1 | 1/2010 | Gudmundson |
| 2010/0027741 A1 | 2/2010 | Doyle |
| 2010/0086185 A1 | 4/2010 | Weiss |

(56) References Cited

U.S. PATENT DOCUMENTS

| | | | |
|---|---|---|---|
| 2010/0098218 A1 | 4/2010 | Vermilyea | |
| 2010/0207741 A1* | 8/2010 | Gudmundson | G01V 5/20 235/375 |
| 2010/0208972 A1* | 8/2010 | Bouchard | G01N 23/00 378/52 |
| 2010/0223016 A1 | 9/2010 | Gibson | |
| 2010/0277312 A1 | 11/2010 | Edic | |
| 2010/0295689 A1 | 11/2010 | Armistead, Jr. | |
| 2010/0302034 A1 | 12/2010 | Clements | |
| 2011/0007870 A1* | 1/2011 | Roux | G01V 5/22 378/57 |
| 2011/0019797 A1 | 1/2011 | Morton | |
| 2011/0033118 A1 | 2/2011 | Yildiz | |
| 2011/0051996 A1* | 3/2011 | Gudmundson | G01N 23/10 382/100 |
| 2011/0172972 A1* | 7/2011 | Gudmundson | G01N 23/083 703/2 |
| 2011/0228896 A1 | 9/2011 | Peschmann | |
| 2011/0235777 A1 | 9/2011 | Gozani | |
| 2012/0069964 A1 | 3/2012 | Scholling | |
| 2012/0093367 A1 | 4/2012 | Gudmundson | |
| 2012/0140879 A1 | 6/2012 | Gudmundson | |
| 2012/0230463 A1 | 9/2012 | Morton | |
| 2012/0275646 A1 | 11/2012 | Drouin | |
| 2013/0034268 A1* | 2/2013 | Perron | G01V 5/22 382/103 |
| 2013/0085788 A1 | 4/2013 | Rowlan | |
| 2013/0114788 A1 | 5/2013 | Crass | |
| 2013/0163811 A1 | 6/2013 | Oelke | |
| 2013/0251098 A1 | 9/2013 | Morton | |
| 2013/0292574 A1 | 11/2013 | Levene | |
| 2013/0294574 A1 | 11/2013 | Peschmann | |
| 2013/0301794 A1 | 11/2013 | Grader | |
| 2013/0336447 A1 | 12/2013 | Morton | |
| 2014/0072108 A1 | 3/2014 | Rohler | |
| 2014/0185923 A1 | 7/2014 | Chen | |
| 2014/0205059 A1 | 7/2014 | Sharpless | |
| 2014/0211917 A1 | 7/2014 | Chen | |
| 2014/0211980 A1 | 7/2014 | Bouchard | |
| 2014/0222385 A1* | 8/2014 | Muenster | G06F 30/00 703/1 |
| 2014/0241495 A1 | 8/2014 | Gudmundson | |
| 2014/0249536 A1 | 9/2014 | Jajeh | |
| 2015/0021342 A1* | 1/2015 | Crass | B65D 1/40 220/660 |
| 2015/0186732 A1 | 7/2015 | Perron | |
| 2015/0268016 A1* | 9/2015 | Eshetu | F42B 8/28 434/11 |
| 2015/0282781 A1 | 10/2015 | Rohler | |
| 2015/0355117 A1 | 12/2015 | Morton | |
| 2016/0025888 A1 | 1/2016 | Peschmann | |
| 2016/0252647 A1 | 9/2016 | Awad | |
| 2016/0260412 A1 | 9/2016 | Awad | |
| 2017/0103513 A1 | 4/2017 | Heilmann | |
| 2017/0184737 A1 | 6/2017 | Dujmic | |
| 2017/0184756 A1 | 6/2017 | Miao | |
| 2017/0236232 A1 | 8/2017 | Morton | |
| 2017/0242148 A1 | 8/2017 | Yu | |
| 2017/0309043 A1 | 10/2017 | Li | |
| 2017/0319169 A1 | 11/2017 | Rohler | |
| 2017/0328844 A1 | 11/2017 | Li | |
| 2017/0371010 A1 | 12/2017 | Shanbhag | |
| 2018/0106733 A1 | 4/2018 | Li | |
| 2018/0162584 A1 | 6/2018 | Tauber | |
| 2019/0003989 A1 | 1/2019 | Miyazaki | |
| 2019/0219729 A1 | 7/2019 | St-Aubin | |
| 2019/0346379 A1 | 11/2019 | Awad | |
| 2019/0346381 A1 | 11/2019 | Awad | |
| 2020/0085404 A1 | 3/2020 | Siewerdsen | |
| 2020/0103548 A1* | 4/2020 | Yu | G01F 22/00 |
| 2020/0110043 A1* | 4/2020 | Marín | G01V 5/20 |
| 2020/0146648 A1 | 5/2020 | Rohler | |
| 2020/0158909 A1 | 5/2020 | Morton | |
| 2020/0211186 A1 | 7/2020 | Gong | |
| 2020/0249179 A1 | 8/2020 | Yamakawa | |
| 2020/0348247 A1 | 11/2020 | Bur | |
| 2020/0355631 A1 | 11/2020 | Yu | |
| 2021/0004994 A1 | 1/2021 | Kubo | |
| 2021/0361254 A1 | 11/2021 | Rohler | |
| 2021/0381991 A1 | 12/2021 | Desjeans-Gauthier | |
| 2022/0291148 A1 | 9/2022 | Gill | |
| 2023/0000459 A1 | 1/2023 | St-Aubin | |
| 2023/0175984 A1 | 6/2023 | Yoshida | |

FOREIGN PATENT DOCUMENTS

| | | | |
|---|---|---|---|
| CA | 2163884 A1 | 12/1994 | |
| CA | 2574402 A1 | 1/2006 | |
| CA | 2744690 | 6/2009 | |
| CA | 2692662 | 3/2010 | |
| CA | 2697525 | 3/2010 | |
| CA | 2709468 | 3/2010 | |
| CA | 2690163 | 8/2011 | |
| CA | 2869201 | 10/2013 | |
| CN | 102175698 | 9/2011 | |
| CN | 103327901 | 9/2013 | |
| CN | 104165896 | 11/2014 | |
| CN | 108937992 A | 12/2018 | |
| CN | 114767137 A | 7/2022 | |
| CN | 116359257 A | 6/2023 | |
| FR | 3037401 | 12/2016 | |
| JP | 3946612 | 7/2007 | |
| WO | 9423458 | 10/1994 | |
| WO | 2006137919 | 12/2006 | |
| WO | 2008133765 | 11/2008 | |
| WO | 2008139167 A2 | 11/2008 | |
| WO | 2008157843 | 12/2008 | |
| WO | 2009114928 | 9/2009 | |
| WO | 2009114928 A1 | 9/2009 | |
| WO | 2010025538 A1 | 3/2010 | |
| WO | WO-2010025539 A1 * | 3/2010 | G06F 18/24 |
| WO | 2013149788 | 10/2013 | |
| WO | 2018121444 | 7/2018 | |

OTHER PUBLICATIONS

International Search Report for International Application No. PCT/CA2013/050744, dated Jun. 10, 2014, (5 pages).

International Search Report & Written Opinion for PCT/CA2019/050616, dated Jul. 5, 2019, (15 pages).

K. Wells; D.A. Bradley;, "A review of X-ray explosives detection techniques for checked baggage", Applied Radiation and Isotopes., Elsevier, Oxford., GB, GB, (Jan. 12, 2012), vol. 70, No. 8, doi:10.1016/j.apradiso.2012.01.011, ISSN 0969-8043, pp. 1729-1746, XP028401820.

Richard D. R. Macdonald, "<title>Design and implementation of a dual-energy x-ray imaging system for organic material detection in an airport security application</title>", Proceedings of SPIE, SPIE, (Apr. 4, 2001), vol. 4301, doi:10.1117/12.420922, ISSN 0277786X, pp. 31-41, XP055104503.

Bond et al., ZeCalc Algorithm Details, Lawrence Livermore National Laboratory, Jan. 7, 2013, Livermore U.S.A.

International Search Report and Written Opinion for International Application No. PCT/CA2018/051674, dated Mar. 29, 2019, (8 pages).

International Search Report and Written Opinion for International Application No. PCT/CA2018/051676, dated Mar. 26, 2019, (7 pages).

International Search Report and Written Opinion for International Application No. PCT/CA2019/050617, dated Jul. 30, 2019, (11 pages).

International Search Report and Written for International Application No. PCT/CA2018/051673, dated Mar. 14, 2019, (8-pages).

International Search Report and Written Opinion for International Application No. PCT/CA2018/051677, dated Mar. 29, 2019, (8 pages).

Hurd et al (U.S. Pat. No. 8,515,010, hereafter referred to as Hurd), Ying et al ("Dual Energy Volumetric X-ray Tomographic Sensor for Luggage Screening", IEEE, SAS Feb. 2007) (Year: 2007).

(56) References Cited

OTHER PUBLICATIONS

International Search Report and Written Opinion for International Application No. PCT/CA2020/051239, dated Dec. 16, 2020, (17 pages).
International Search Report for corresponding International Patent Application No. PCT/CA2014/051074 dated Jan. 20, 2015.
International Search Report for corresponding International Patent Application No. PCT/CA2014/050981 dated Jan. 5, 2015, 6 pgs.
Hassanpour et al (NPL "Illicit Material Detection using Dual-Energy X-ray Images", The International Arab Journal of Information Technology, vol. 13, No. 4, Jul. 2016, p. 8) (Year: 2016).
Lehmann et al., Generalized image combinations in dual KVP digital radiography, Medical Physics, Sep. 1981, 659-667, 8-5, American Association of Physicists in Medicine.
International Search Report and Written Opinion for International Application No. PCT/CA2018/051675, dated Mar. 21, 2019, (11 pages).

* cited by examiner

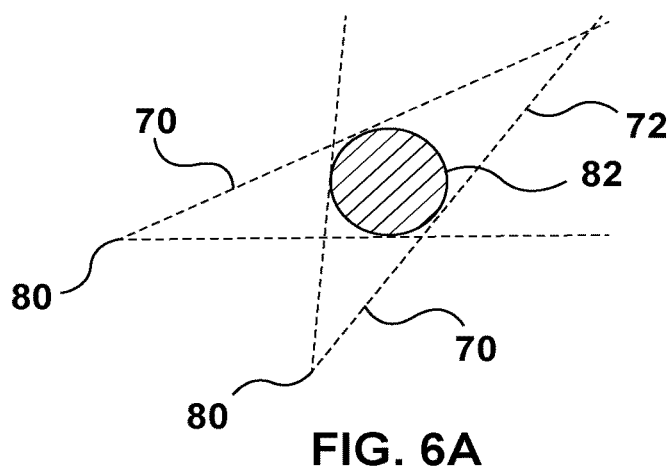
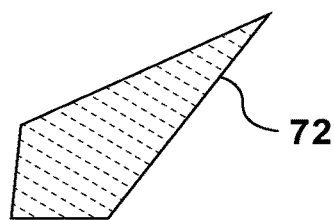
FIG. 6A
FIG. 6B
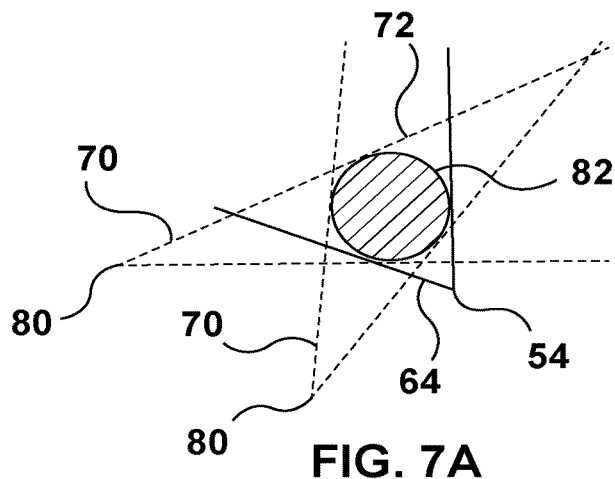
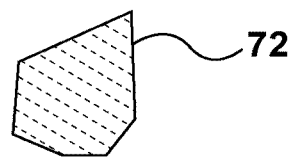
FIG. 7A
FIG. 7B
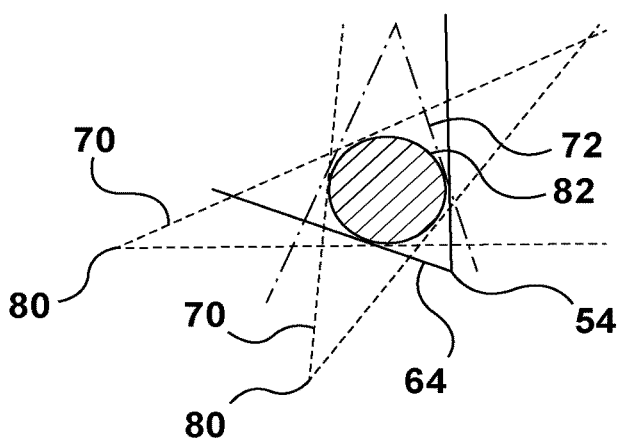
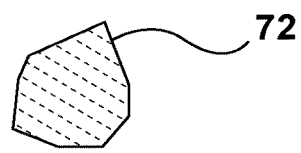
FIG. 8A
FIG. 8B

TRAY INSERT FOR SCREENING TRAY

CROSS-REFERENCE

The present application is a continuation application of U.S. patent application Ser. No. 17/286,858, titled "Insert for Screening Tray" and filed on Apr. 20, 2021, which is a national stage entry application of PCT/CA2019/051489, titled "Tray Insert for Screening Tray" and filed on Oct. 21, 2019, which, in turn, relies on U.S. Patent Provisional Application No. 62/748,841, filed on Oct. 22, 2018, for priority. All of the above application are herein incorporated by reference in their entirety.

FIELD

The present invention relates to screening technology for analyzing the properties of a liquid, aerosol or gel material and, in particular, analyzing the properties of a liquid, aerosol or gel material within a container.

BACKGROUND

As a matter of public safety, some locations may be provided with screening devices such as x-ray screening devices for the purpose of screening people and objects so as to identify and prevent the unauthorized passage of weapons, dangerous materials, contraband or other undesirable items into or out of the location.

Liquid, aerosol or gel (LAG) materials are of particular concern because they can be stored in small containers, such as drinking bottles, that are often carried by passengers. The LAG materials may potentially be composed of an explosive material. Moreover, non-explosive LAG materials, particularly liquids, may be stored in separate containers in an effort to circumvent screening measures. Such materials may potentially be later combined to make a material which is explosive. The volume of potentially explosive LAG material stored in small containers such as drinking bottles may be sufficient to damage an aircraft or pose a serious safety risk to passengers nearby in an aircraft or in an airport. It may also be desired to identify the properties of a LAG material regardless of whether it is potentially dangerous. Proper identification of LAG materials and their properties during screening operations is therefore important. Moreover, there is a need for such assessment to be done in a timely manner because locations such as airports are high traffic areas which require a high throughput at security screening stations.

Security screening of LAG materials typically begins with the scanning of a container filled or partially filled with a LAG material using a security screening device such as an X-ray scanner. The X-ray scanner will produce data which may be analyzed at least in part by software in order to make an assessment as to the properties or characteristics of the LAG material. However, the data representing the LAG material must be distinguished from data representing other surrounding materials such as the materials of the container or luggage.

This portion of the analysis can be very intensive. Some algorithms rely on an iterative process to determine a "best fit" solution to define the range of data representing the LAG material. Such iterative processes are affected by the volume of data to be analyzed. The greater the amount of data to be analyzed that does not represent the LAG material of interest, such as that representing surrounding materials, the longer the process takes to determine which data does represent the LAG material. Therefore, the longer it will take for analysis to begin for the purpose of determining the properties of the LAG material and, more importantly, its potential threat status. Moreover, the greater the amount of data to be analyzed, the greater the potential for error in properly identifying the "best fit" solution to define the range of data representing the LAG material.

Hence, in light of the aforementioned, there is a need for means to reduce the range of data to be analyzed for the purpose identifying the range of data representing a LAG material of interest for assessment during a screening operation.

SUMMARY

The present invention relates to screening technology for analyzing the properties of a liquid, aerosol or gel material and, in particular, analyzing the properties of a liquid, aerosol or gel material within a container.

One general aspect includes a scanning system including an article for screening having a longitudinal recess extending at least partially across a top surface portion of the article. The longitudinal recess includes a first lateral wall portion extending into the article and meeting with a base wall portion at a predetermined angle therebetween for positioning of a liquid material relative to the first lateral wall portion and the base wall portion. The scanning system also includes at least one source for passing electromagnetic radiation through the liquid material to be detected by at least one detector. The at least one detector provides data in a data range, the data representing the liquid material and at least one other material. A processor restricts the data range to data provided within the predetermined angle between the first lateral wall portion and the base wall portion of the longitudinal recess. The longitudinal recess may further include an end wall portion extending into the article and from which the first lateral wall portion and the base wall portion extend. The longitudinal recess may further include a second lateral wall portion spaced apart from the first lateral wall portion with the base wall portion extending between the first lateral wall portion and the second lateral wall portion. The longitudinal recess may be sloped along a length thereof. The system may further include a displacement assembly for displacing the article relative to the source. The liquid material may be contained within a container and the longitudinal recess may be for positioning of the container therewithin. In one aspect, the article for screening is an insert for a security screening tray. In another aspect, the article for screening is a security screening tray.

In another aspect, the electromagnetic radiation emitted from the at least one source may pass through the liquid material within a predetermined angular range. The processor may further restrict the data range to data also provided within the predetermined angular range. A plurality of sources may be positioned at different positions relative to the liquid material and the data range may be restricted based on the predetermined angular range provided by one or more of the sources. The scanning system may further include a camera positioned relative to the liquid material and having a predetermined optical angular range. The processor may further restrict the data range to data provided within the predetermined optical angular range.

In another aspect, the system includes a plurality of longitudinal recesses spaced apart about the top surface portion of the article and each for positioning of a respective liquid material relative thereto.

In another aspect, the base wall portion of the longitudinal recess may be sloped toward the first lateral wall portion for biasing a liquid material positioned in the longitudinal recess toward the first lateral wall portion. The longitudinal recess may be sloped along a length thereof and the longitudinal recess may further include an end wall portion extending into the insert and from which the first lateral wall portion and the base wall portion extend to define a lowest recess portion of the longitudinal recess.

In one general aspect, there is provided an article for screening including a top surface portion and a bottom surface portion. A forward wall portion, an aft wall portion and side wall portions each extend between the top surface portion and the bottom surface portion. The article also includes a longitudinal recess extending at least partially across the top surface portion, the longitudinal recess having a first lateral wall portion extending away from the top surface portion toward the bottom surface portion and meeting with a base wall portion at a predetermined angle therebetween for positioning of a liquid material relative to the first lateral wall portion and the base wall portion. Data in a data range provided by a scanning operation of the liquid material may be restricted to a processor to data provided within the predetermined angle between the first lateral wall portion and the base wall portion of the longitudinal recess. The longitudinal recess may further include a second lateral wall portion extending away from the top surface portion toward the bottom surface portion and spaced apart from the first lateral wall portion with the base wall portion extending between the first lateral wall portion and the second lateral wall portion. The longitudinal recess may be sloped along a length thereof. The liquid material may be contained within a container and the longitudinal recess may be for positioning of the container therewithin. In one aspect, the article for screening is an insert for a security screening tray. In another aspect, the article for screening is a security screening tray.

The longitudinal recess may further include an end wall portion extending away from the top surface portion and toward the bottom surface portion and from which the first lateral wall portion and the base wall portion extend.

In one aspect, the tray includes a plurality of longitudinal recesses spaced apart about the top surface of the article and each for positioning of a respective liquid material relative thereto.

In another aspect, the base wall portion of the longitudinal recess may be sloped toward the first lateral wall portion for biasing a liquid material positioned in the longitudinal recess toward the first lateral wall portion. The longitudinal recess may be sloped along a length thereof and the longitudinal recess may further include an end wall portion extending away from the top surface portion and toward the bottom surface portion and from which the first lateral wall portion and the base wall portion extend to define a lowest recess portion of the longitudinal recess.

The components, advantages and other features of the scanning system and tray insert will become more apparent upon reading of the following non-restrictive description of some optional configurations, given for the purpose of exemplification only, with reference to the accompanying drawings.

BRIEF DESCRIPTION OF THE DRAWINGS

FIG. 6A is a view of the restrictive sectors provided by two sources;

FIG. 6B is a view of the bounding box generated by the restrictive sectors of the two sources of FIG. 6A;

FIG. 7A is a view of the restrictive sectors of FIG. 6A with the restrictive sector provided by the tray insert in accordance with the present invention;

FIG. 7B is a view of the bounding box generated by the restrictive sectors of the two sources and the tray insert of FIG. 7A;

FIG. 8A is a view of the restrictive sectors of FIG. 7A with the restrictive sector provided by the camera;

FIG. 8B is a view of the bounding box generated by the restrictive sectors of the two sources, the tray insert and the camera of FIG. 8A; and, FIG. 9 is a perspective view of the bounding box of FIGS. 7A and 7B positioned within the longitudinal recess.

DETAILED DESCRIPTION

The present invention relates to screening technology for analyzing the properties of a liquid, aerosol or gel (LAG) material and, in particular, analyzing the properties of a liquid, aerosol or gel material within a container.

As used herein, the term "liquid" is intended to refer to liquid, aerosol or gel (LAG) materials. The terms "liquid material" and "LAG material" may be used interchangeably herein. Accordingly, the use of the term "liquid" herein is not to be interpreted as being limited strictly to only liquid materials.

Figure 1:
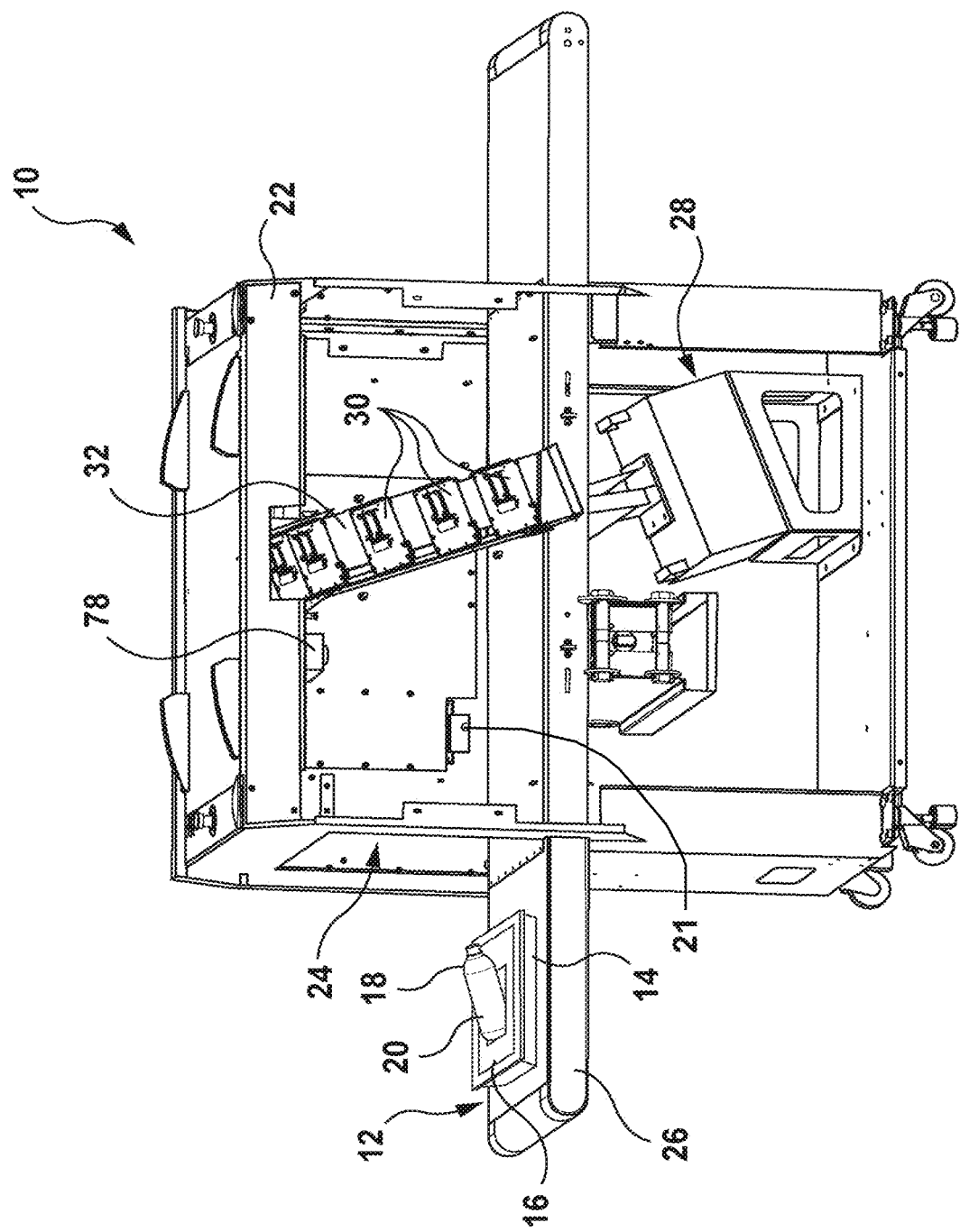
FIG. 1 is a perspective view of a scanning system which may be used in accordance with the present invention.

According to one aspect as shown in FIG. 1, there is provided a system 10 for scanning an object 12 with electromagnetic (EM) radiation. The object 12 may include one or more items which may be composed of one or more materials. In the illustrative aspect shown in FIG. 1, object 12 includes an article for screening such as a tray 14 for screening, preferably with an insert 16 for the tray 14 as described hereinafter, a container 18 and a liquid (or LAG) material 20 of interest contained within the container 18. The system 10 as described hereinafter is directed to the scanning of an object 12 which includes at least one liquid, aerosol or gel (LAG) material.

The system 10 has a frame 22 which defines a scanning chamber 24 wherein the scanning operation is performed. The system 10 preferably includes a displacement assembly 26, such as a conveyor, as shown in FIG. 1. The displacement assembly 26 displaces the object 12 within and preferably through the scanning chamber 24. The system 10 further includes at least one source 28 for emitting electromagnetic (or EM) radiation which impacts and/or passes through the object 12 at least once during a scanning operation. Although only one source 28 is shown in FIG. 1, it should be understood that any number of sources may be positioned about the scanning chamber 24 for scanning the object 12. The electromagnetic radiation passing through the object 12 is received by at least one detector 30 and preferably by a plurality of detectors 30 disposed in a detector array 32. On the basis of the EM radiation detected by the detectors 30, data is provided which may be analyzed by at least one processor 21 to determine the properties of the materials of which the object 12 is composed. Based on the determined properties of the materials, the system 10 may further determine whether one or more of the materials in the object 12 is potentially dangerous. If so, an alert condition may be raised.

Under certain circumstances, such as at airport security screening stations, solid materials such as clothing or luggage or liquid materials within containers will be placed in a tray 14, as shown in FIG. 1 prior to a scanning operation. The tray 14 and contents may then be scanned to determine the properties of the materials of which the contents are composed. Such trays 14 are typically rectangular in shape with flat or generally flat bases and are of suitable, and preferably standard, dimensions to pass into, through and out of the scanning chamber 24 of a scanning system 10 such as that shown in FIG. 1. Such trays 14 are suitable for scanning solid materials such as clothing or luggage. However, when scanning containers containing liquid material, there is added difficulty in that liquid contents of containers or the containers themselves may shift during the scanning operation. This shifting may cause erroneous or inconsistent readings to be output from the scanning operation.

In one aspect of the present invention, there is provided a tray insert 16 which not only stabilizes the liquid material 20 for the scanning operation, but also limits or restricts the range of data to be processed so as to more clearly identify the data representing the liquid material 20. The tray insert 16 may be formed of any suitable material and may be removably coupled with a suitable tray 14, permanently secured with the tray 14, and in some aspects, may be integral with the tray 14.

Figure 2:
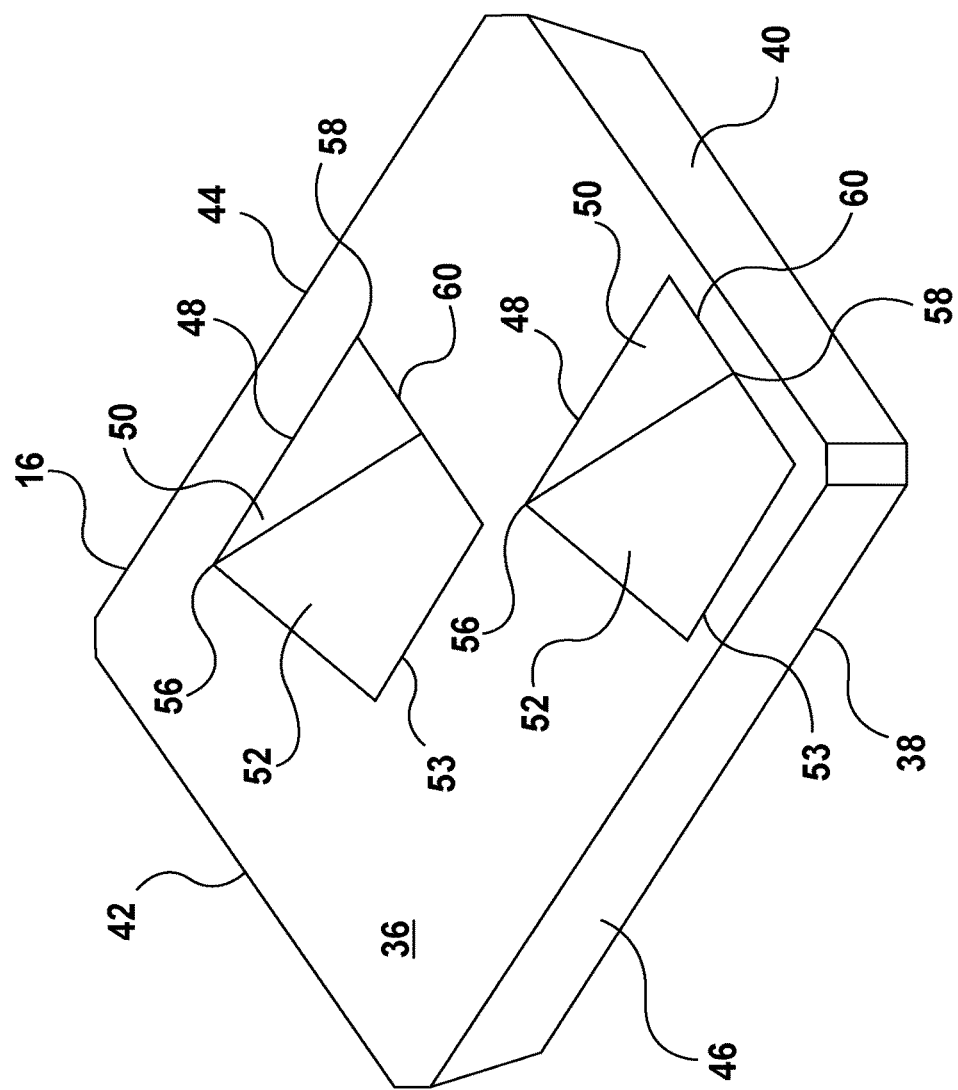
FIG. 2 is a top-front-right view of a tray insert in accordance with the present invention.
Figure 3:
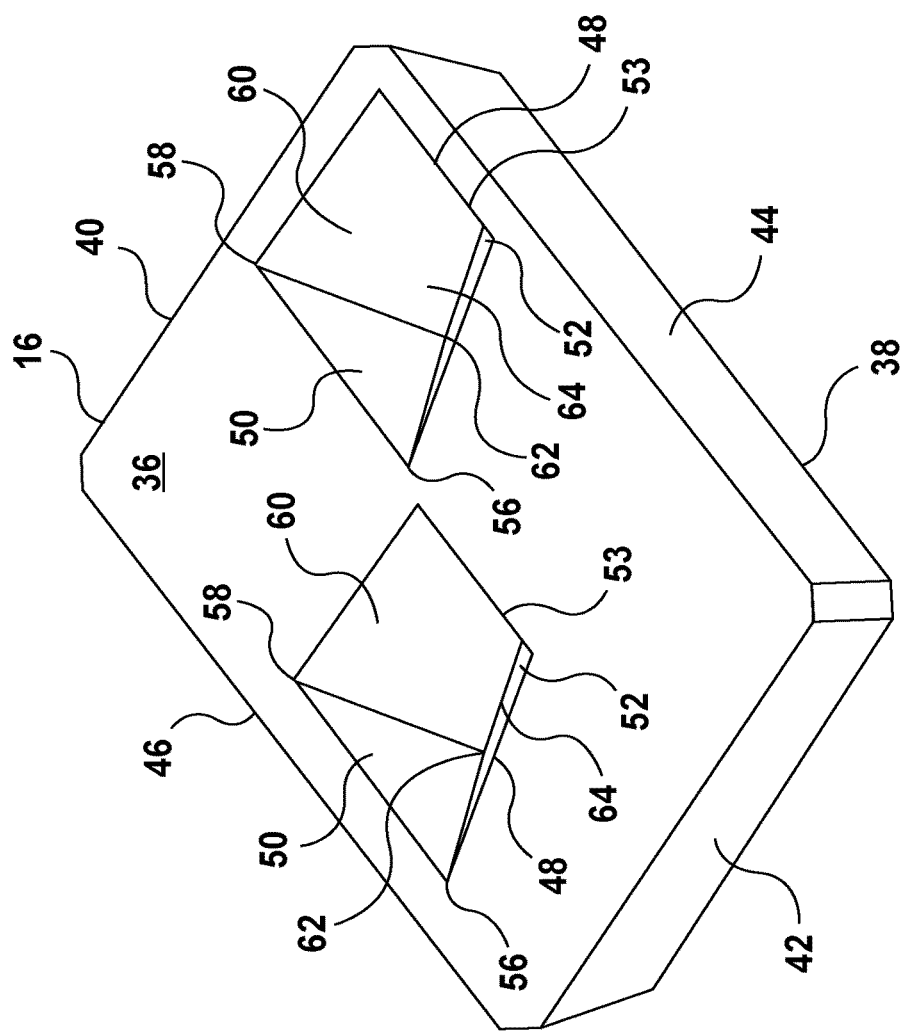
FIG. 3 is a top-rear-right view of the tray insert of FIG. 2.
Figure 4:
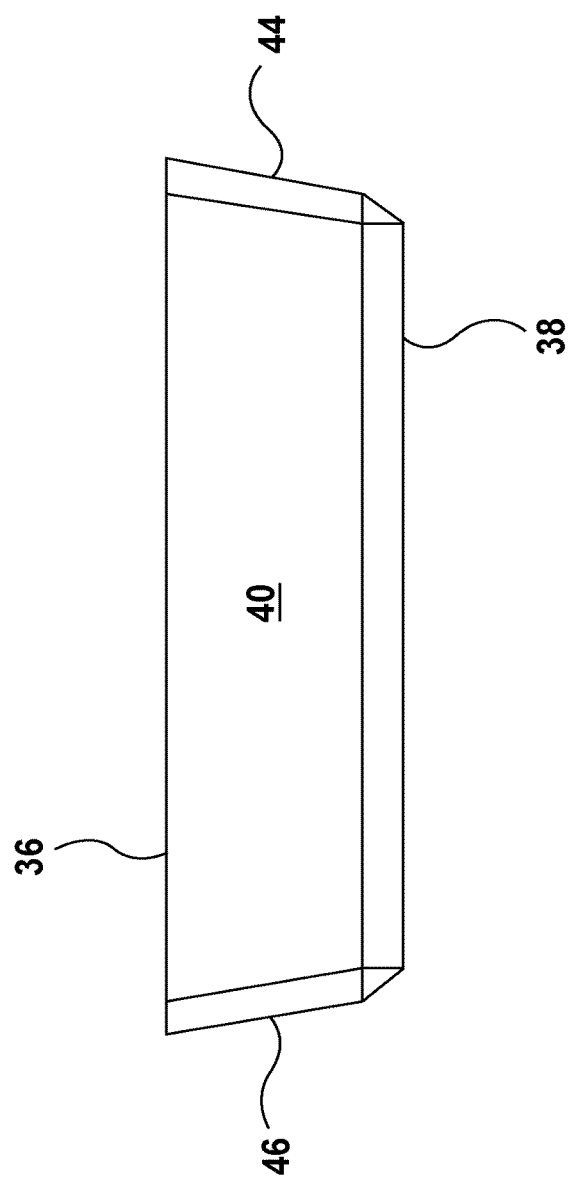
FIG. 4 is a front view of the tray insert of FIG. 2 with the rear view being a mirror image thereof.
Figure 5:
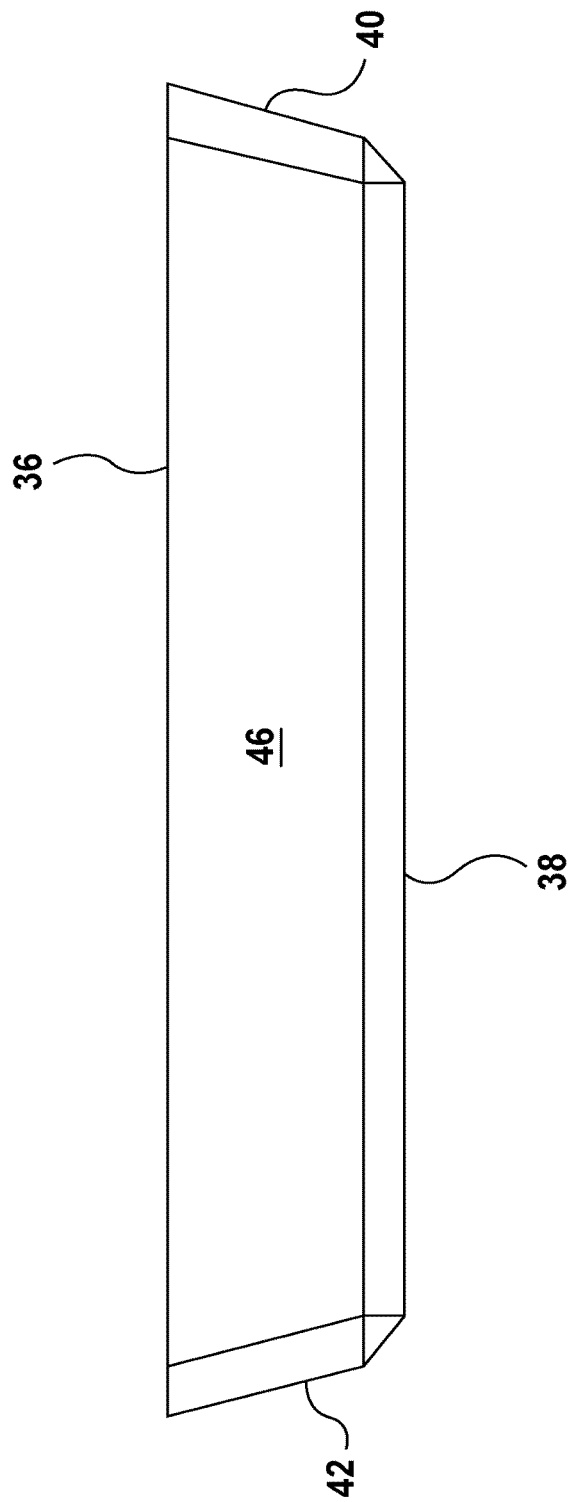
FIG. 5 is a right side view of the tray insert of FIG. 2 with the left side view being a mirror image thereof.

The tray insert 16 is preferably of a shape to be inserted into a suitable tray 14. Preferably, the tray 14 is a standard rectangular tray 14 and accordingly, the tray insert 16 is also rectangularly shaped as shown in FIGS. 2 and 3. The tray insert 16 includes a top surface portion 36, a bottom surface portion 38 and four wall portions extending between the top surface portion 36 and the bottom surface portion 38. The four wall portions include a forward wall portion 40, an aft wall portion 42 and two side wall portions 44, 46 extending between and spaced apart by the forward wall portion 40 and the aft wall portion 42. Preferably, the four wall portions 40, 42, 44, 46 taper inwardly from the top surface portion 36 toward the bottom surface portion 38 of the tray insert 16 as shown in FIGS. 4 and 5. The tray 14 in which the tray insert 16 will be placed may have tapered walls. Accordingly, the wall portions 40, 42, 44, 46, when tapered, provide for easier retrofitting of the insert 16 into the tray 14 and easier removal from the tray 14 if so desired.

Preferably, the tray insert 16 includes at least one longitudinal recess 48 extending from the top surface portion 36 of the tray 14 toward the bottom surface portion 38 of the tray 14 for positioning of a liquid material 20 relative thereto. The liquid material 20 may be so positioned by placing a container 18 containing the liquid material 20 in the at least one longitudinal recess 48. The tray insert 16 may include any number of such longitudinal recesses 48 as the area of the top surface portion 36 tray insert 16 may permit. Preferably, the tray insert 16 includes two longitudinal recesses 48 spaced apart relative the top surface portion 36 of the tray insert 16 as shown in FIGS. 2 and 3.

Each longitudinal recess 48 includes a first lateral wall portion 50 extending away from the top surface portion 36 of the tray insert 16 toward the bottom surface portion 38 of the tray insert 16 to meet with a base wall portion 52. The first lateral wall portion 50 and the base wall portion 52 meet at a predetermined angle 54 therebetween. The base wall portion 52 is preferably sloped toward the first lateral wall portion 50 for biasing a container 18 having a liquid material 20 therein toward the first lateral wall portion 50. Preferably, the longitudinal recess 48 itself is also sloped along a length thereof between a forward end 56 of the longitudinal recess 48 and an aft end 58 of the longitudinal recess 48. Preferably, the longitudinal recess 48 also includes an end wall portion 60 which extends into the tray insert 16 away from the top surface portion 36 toward the bottom surface portion 38 of the tray insert 16. Preferably, the first lateral wall portion 50 and the base wall portion 52 extend from the end wall portion 60. Preferably, the forward end 58 of the longitudinal recess 48 is adjacent to the end wall portion 60. The longitudinal recess 48 further includes a second lateral wall portion 53 extending away from the top surface portion 36 of the insert 16 toward the bottom surface portion 38 of the tray insert 16. Second lateral wall portion 53 is spaced apart from the first lateral wall portion 50 with the base wall portion 52 extending between the first lateral wall portion 50 and the second lateral wall portion 52.

As mentioned above, the base wall portion 52 is preferably sloped toward the first lateral wall portion 50 for biasing a container 18 having a liquid material 20 therein toward the first lateral wall portion 50. Since the first lateral wall portion 50 and the base wall portion 52 preferably extend from end wall portion 60 to define the longitudinal recess 48 and since the longitudinal recess 48 is also preferably sloped along a length thereof between an aft end 56 of the longitudinal recess 48 and a forward end 58 of the longitudinal recess 48 with the forward end 58 adjacent to the end wall portion 60, there is defined a lowest recess portion 62 in the longitudinal recess 48 toward which the container 18 is also biased. Thereby, the container 18 containing the liquid material 20 is stabilized within the longitudinal recess 48 between the first lateral wall portion 50, the base wall portion 52 and the end wall portion 60. By biasing the container into abutment with the first lateral wall portion 50 and the base wall portion 52 disposed at a predetermined angle relative to one another, there is also provided a restrictive sector 64 which may be relied upon reduce the range of data to be processed in order to determine the properties of a liquid material during a scanning operation.

In a scanning operation using the system 10 for screening a liquid (or LAG) material contained within a container 18, a user will place the container 18 within the longitudinal recess 48 of the tray insert 16, preferably already located within the tray 14 for scanning. The tray 14, with insert 16 and container 18 therein, will be placed on the displacement assembly 26 and the container 18 will be displaced into the scanning chamber 24 and into the range of the at least one source 28. The source 28 will emit radiation which is absorbed by or passes through the tray 14, the insert 16, the container 18 and the liquid material 20 at least once during a scanning operation to be received by the at least one detector 30 and preferably by an array of detectors 32.

Based on the energy of the radiation detected by the detectors 30, data representative of a "slice" or a cross-section of the scanned object 12 is provided to at least one processor as shown in FIG. 6A. The data is in a data range and represents the liquid material 20 and at least one other material. The at least one other material may include, for example, the container 18 or other materials surrounding the liquid material 20. Such surrounding materials include materials encountered by the x-ray both before the x-ray passes through the liquid material 20, such as materials positioned between the source and the liquid material, and after the x-ray passes through the liquid material, such as materials located between the liquid material and the detectors 30. By way of non-limiting example, such other materials may include the displacement assembly 26, the tray 14, the tray insert 16 and the walls of the container 18. In order to identify one or more properties of the liquid material 20, the processor must identify or estimate the data in the data range representing only the liquid material 20.

Although the present invention may function without such algorithms, current algorithms not described herein permit for the restriction of the data in the data range to be processed by the processor to the data provided within the angular range 70 of the EM radiation that has been absorbed by or passed through the container 18. The angular range 70 may, for example, extend from a source focal point 80, representing a point of emission from which the x-ray energy is emitted by the x-ray source, and may be delimited by another suitable known parameter, such as the known dimensions of the scanning chamber or the bounds of another angular range extending from another source focal point. The data range restriction is illustrated, for example, in FIGS. 6A and 6B wherein there is shown a "bounding box" 72 surrounding the data representing a cross-section 82 of the liquid material 20. A single source 28 of radiation with suitable limitation of the angular range may be sufficient to define such a bounding box 72. However, it should be understood that a scanning system 10 may include multiple sources 28 of EM radiation disposed about the object 12 in different positions. The angular range 70 of radiation from each of the sources 28 that has been absorbed by or passed through the container 18 may be determined and used together to further define the bounding box 72 shown in FIGS. 6A and 6B.

As an example, an iterative process, not described herein, may be used to determine a "best-fit" solution to estimate the data in the data range representing only the liquid material 20. The data in the data range representing only the liquid material 20 is shown as cross-section 82 in FIGS. 6A, 7A and 8A. Such an iterative process would solve for such a "best-fit" solution using all of the data within the bounding box 72 and seeking convergence with the data representing only the liquid material 20. The convergence represents the "best fit" estimation of the data in the data range representing the surface of the liquid material 20 within the container 18. The larger the bounding box 72, the more data must be processed in order to find the best estimate of the data representing the liquid material 20. Conversely, the greater the restriction that can be provided on the data in the data range without restricting data to the point of excluding data representing the liquid material 20 (i.e. the smaller the bounding box 72), the more accurately the data representing only the liquid material 20 can be estimated.

As previously described, the first lateral wall portion 50 and the base wall portion 52 are disposed relative to one another at a predetermined angle 54 therebetween. Since the container 18 containing the liquid material 20 is biased into contact with the first lateral wall portion 50 and base wall portion 52 of the longitudinal recess 48, it is therefore known that data produced outside this predetermined angle 54 does not contain the liquid material 20. There is therefore provided a restrictive sector 64 on the data which restricts the data range to data within the predetermined angle 54 between the first lateral wall portion 50 and the base wall portion 52. This restrictive sector 64 is independent from the restriction provided by the algorithmically determined angular range 70 of the radiation from each of the sources 28 that has been absorbed by or passed through the container 18. However, the restrictive sector 64 and the angular range 70 of the EM radiation that has passed through the container 18 may be used together to restrict the data to be processed. This is shown, for example, in FIGS. 7A and 7B wherein the bounding box 72 of FIG. 6A is further limited using the restrictive sector 64 provided by the first lateral wall portion 50 and base wall portion 52 of the longitudinal recess 48.

Figure 9:
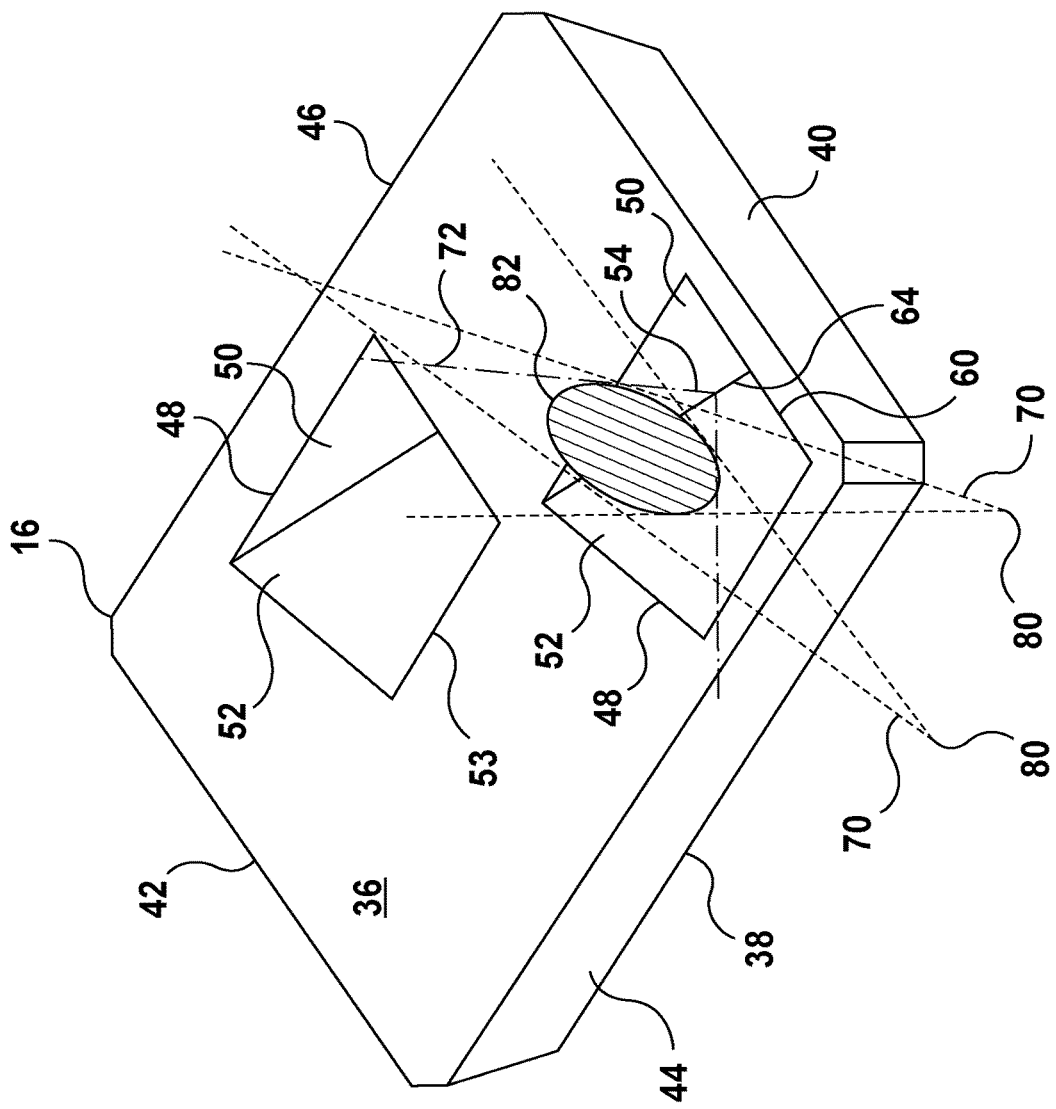

FIG. 9 illustrates the relationship between the bounding box 72, the data representing a cross-section 82 of the liquid material 20 and the longitudinal recess 48 of the tray insert 16. In FIG. 9, the data representing the cross-section 82 of the liquid material 20 is located within bounding box 72. Bounding box 72 is delimited by two angular ranges 70 provided by the x-ray emissions from two sources positioned about the object 12 and is further delimited by the restrictive sector 64 provided by the predetermined angle 54 between the first lateral wall portion 50 and base wall portion 52 of the longitudinal recess 48.

With reference to FIGS. 8A and 8B, there is shown a further example wherein an optical camera 78 may be used to further limit the bounding box 72. The camera 78 may be positioned at any suitable location within or outside of the scanning chamber 24, as shown in FIG. 1, and optically identifies the position of the container 18 within the scanning chamber 24 during the scanning operation. This information may also be applied to the data to further restrict the data to be processed.

In addition to the first angular range 70 of the radiation emitted by the source 28 and impacting the material of interest, the restrictive sector 64 provided by the longitudinal recess 48 in the tray insert 16 and the camera 78, it should be understood that other means may be relied upon for reducing the size of the bounding box 72 surrounding the data representing the liquid (or LAG) material 20 of interest to thereby increase the speed and accuracy with which the properties of the liquid material 20 are determined.

By reducing the amount of data to be processed during a scanning operation, there is provided savings in both time and cost. Operationally, security screening may be performed at a faster rate which may increase the throughput of scanned passenger goods in high-traffic locations such as airports. Moreover, the reduction in data to be processed also increases the accuracy with which the data representing the liquid material is determined. This subsequently leads to greater accuracy in determining the properties of the liquid material and whether or not those properties may be indicative of a potentially threatening material.

While there have been described herein what are considered to be preferred and exemplary aspects of the present invention, other modifications of the invention shall be apparent to those skilled in the art from the teachings herein and, it is therefore desired to be secured in the appended claims all such modifications as fall within the scope of the invention.

The invention claimed is:

1. A scanning system comprising:
   an article for screening;
   a longitudinal recess extending at least partially across a top surface portion of the article, the longitudinal recess having a first lateral wall portion extending into the article and meeting with a base wall portion, thereby defining a predetermined angle therebetween for positioning of a liquid material relative to the first lateral wall portion and the base wall portion;
   at least one source for passing electromagnetic radiation through the article, wherein the electromagnetic radiation has an angular range when passing through the article and wherein the angular range at least partially defines a bounded region;

at least one detector configured to detect electromagnetic radiation passing through the article and generate data, wherein the data represents the liquid material and at least one other material; and a processor configured to use the predetermined angle to reduce a size of the bounded region and determine a subset of said data by identifying a portion of said data in said reduced bounded region, wherein said subset is representative of the liquid material.

2. The scanning system of claim 1, wherein the longitudinal recess further includes an end wall portion extending into the article and from which the first lateral wall portion and the base wall portion extend.

3. The scanning system of claim 1, wherein the longitudinal recess is sloped along a length thereof.

4. The scanning system of claim 1, wherein the at least one source comprises a plurality of sources at different positions relative to the liquid material.

5. The scanning system of claim 1, further comprising a camera positioned relative to the liquid material and having a predetermined optical angular range, wherein the processor is further configured to determine a subset of said data by identifying a portion of said within the predetermined optical angular range.

6. The scanning system of claim 1, further comprising a displacement assembly configured to displace the article relative to the at least one source.

7. The scanning system of claim 1, wherein the at least one detector is configured to detect electromagnetic radiation passing through at least one of a liquid material, an aerosol material and a gel material.

8. The scanning system of claim 1, further comprising additional longitudinal recesses spaced apart from the longitudinal recess about the top surface portion of the article, wherein each of the additional longitudinal recesses is configured to position a respective liquid material relative thereto.

9. The scanning system of claim 1, wherein the base wall portion of the longitudinal recess is sloped toward the first lateral wall portion and adapted to bias a liquid material positioned in the longitudinal recess toward the first lateral wall portion.

10. The scanning system of claim 1, wherein the longitudinal recess further comprises a second lateral wall portion spaced apart from the first lateral wall portion with the base wall portion extending between the first lateral wall portion and the second lateral wall portion.

11. The scanning system of claim 1, wherein the liquid material is contained within a container and the longitudinal recess is adapted for positioning of the container therewithin.

12. The scanning system of claim 1, wherein the article for screening is an insert for a security screening tray.

13. The scanning system of claim 1, wherein the article for screening is a security screening tray.

14. The scanning system of claim 9, wherein the longitudinal recess is sloped along a length thereof.

15. The scanning system of claim 14, wherein the longitudinal recess further comprises an end wall portion extending into the article and from which the first lateral wall portion and the base wall portion extend to define a lowest recess portion of the longitudinal recess.

* * * * *